US011367092B2

(12) United States Patent
Zhang et al.

(10) Patent No.: US 11,367,092 B2
(45) Date of Patent: Jun. 21, 2022

(54) METHOD AND APPARATUS FOR EXTRACTING AND PROCESSING PRICE TEXT FROM AN IMAGE SET

(71) Applicant: SYMBOL TECHNOLOGIES, LLC, Lincolnshire, IL (US)

(72) Inventors: Yan Zhang, Buffalo Grove, IL (US); Robert E. Beach, Los Altos, CA (US); Bo Fu, Wheeling, IL (US); Yan-Ming Cheng, Inverness, IL (US); Jordan Varley, Mississauga (CA); Iaacov Coby Segall, Toronto (CA)

(73) Assignee: Symbol Technologies, LLC, Holtsville, NY (US)

( * ) Notice: Subject to any disclaimer, the term of this patent is extended or adjusted under 35 U.S.C. 154(b) by 795 days.

(21) Appl. No.: 15/583,801

(22) Filed: May 1, 2017

(65) Prior Publication Data

US 2018/0315065 A1     Nov. 1, 2018

(51) Int. Cl.
*G06Q 30/02*     (2012.01)
*G06V 20/52*     (2022.01)
*G06V 20/62*     (2022.01)
*G06V 30/224*     (2022.01)
*G06V 30/10*     (2022.01)

(52) U.S. Cl.
CPC ......... *G06Q 30/0206* (2013.01); *G06V 20/52* (2022.01); *G06V 20/62* (2022.01); *G06V 30/224* (2022.01); *G06V 30/10* (2022.01)

(58) Field of Classification Search
CPC ......... G06Q 10/00–50/00; G06V 10/00–40/00
USPC ....................................... 705/7.35, 7.11–7.42
See application file for complete search history.

(56) References Cited

U.S. PATENT DOCUMENTS

| | | |
|---|---|---|
| 5,209,712 A | 5/1993 | Ferri |
| 5,214,615 A | 5/1993 | Bauer |
| 5,408,322 A | 4/1995 | Hsu et al. |
| 5,414,268 A | 5/1995 | McGee |
| 5,534,762 A | 7/1996 | Kim |
| 5,566,280 A | 10/1996 | Fukui et al. |
| 5,953,055 A | 9/1999 | Huang et al. |

(Continued)

FOREIGN PATENT DOCUMENTS

| | | |
|---|---|---|
| CA | 2835830 | 11/2012 |
| CA | 3028156 | 1/2018 |

(Continued)

OTHER PUBLICATIONS

International Search Report and Written Opinion for International Patent Application No. PCT/US2013/070996 dated Apr. 2, 2014.

(Continued)

*Primary Examiner* — Alan S Miller

(57) ABSTRACT

A method of extracting price text from an image set includes: obtaining input data comprising (i) a plurality of images depicting shelves supporting products, and (ii) for each of the images, a set of text regions and corresponding price text strings; registering the images to a common frame of reference; identifying a subset of the text regions having overlapping locations in the common frame of reference; selecting one of the text regions from the subset; and presenting the price text string corresponding to the one of the text regions for further processing.

18 Claims, 8 Drawing Sheets

(56) References Cited

U.S. PATENT DOCUMENTS

| | | |
|---|---|---|
| 5,988,862 A | 11/1999 | Kacyra et al. |
| 6,026,376 A | 2/2000 | Kenney |
| 6,034,379 A | 3/2000 | Bunte et al. |
| 6,075,905 A | 6/2000 | Herman et al. |
| 6,115,114 A | 9/2000 | Berg et al. |
| 6,141,293 A | 10/2000 | Amorai-Moriya et al. |
| 6,304,855 B1 | 10/2001 | Burke |
| 6,442,507 B1 | 8/2002 | Skidmore et al. |
| 6,549,825 B2 | 4/2003 | Kurata |
| 6,580,441 B2 | 6/2003 | Schileru-Key |
| 6,711,293 B1 | 3/2004 | Lowe |
| 6,721,769 B1 | 4/2004 | Rappaport et al. |
| 6,836,567 B1 | 12/2004 | Silver et al. |
| 6,995,762 B1 | 2/2006 | Pavlidis et al. |
| 7,090,135 B2 | 8/2006 | Patel |
| 7,137,207 B2 | 11/2006 | Armstrong et al. |
| 7,245,558 B2 | 7/2007 | Willins et al. |
| 7,248,754 B2 | 7/2007 | Cato |
| 7,277,187 B2 | 10/2007 | Smith et al. |
| 7,373,722 B2 | 5/2008 | Cooper et al. |
| 7,474,389 B2 | 1/2009 | Greenberg et al. |
| 7,487,595 B2 | 2/2009 | Armstrong et al. |
| 7,493,336 B2 | 2/2009 | Noonan |
| 7,508,794 B2 | 3/2009 | Feather et al. |
| 7,527,205 B2 | 5/2009 | Zhu et al. |
| 7,605,817 B2 | 10/2009 | Zhang et al. |
| 7,647,752 B2 | 1/2010 | Magnell |
| 7,693,757 B2 | 4/2010 | Zimmerman |
| 7,726,575 B2 | 6/2010 | Wang et al. |
| 7,751,928 B1 | 7/2010 | Antony et al. |
| 7,783,383 B2 | 8/2010 | Eliuk et al. |
| 7,839,531 B2 | 11/2010 | Sugiyama |
| 7,845,560 B2 | 12/2010 | Emanuel et al. |
| 7,885,865 B2 | 2/2011 | Benson et al. |
| 7,925,114 B2 | 4/2011 | Mai et al. |
| 7,957,998 B2 | 6/2011 | Riley et al. |
| 7,996,179 B2 | 8/2011 | Lee et al. |
| 8,009,864 B2 | 8/2011 | Linaker et al. |
| 8,049,621 B1 | 11/2011 | Egan |
| 8,091,782 B2 | 1/2012 | Cato et al. |
| 8,094,902 B2 | 1/2012 | Crandall et al. |
| 8,094,937 B2 | 1/2012 | Teoh et al. |
| 8,132,728 B2 | 3/2012 | Dwinell et al. |
| 8,134,717 B2 | 3/2012 | Pangrazio et al. |
| 8,189,855 B2 * | 5/2012 | Opalach ............... G06Q 10/087 382/100 |
| 8,199,977 B2 | 6/2012 | Krishnaswamy et al. |
| 8,207,964 B1 | 6/2012 | Meadow et al. |
| 8,233,055 B2 | 7/2012 | Matsunaga et al. |
| 8,265,895 B2 | 9/2012 | Willins et al. |
| 8,277,396 B2 | 10/2012 | Scott et al. |
| 8,284,988 B2 | 10/2012 | Sones et al. |
| 8,423,431 B1 | 4/2013 | Rouaix et al. |
| 8,429,004 B2 | 4/2013 | Hamilton et al. |
| 8,463,079 B2 | 6/2013 | Ackley et al. |
| 8,479,996 B2 | 7/2013 | Barkan et al. |
| 8,520,067 B2 | 8/2013 | Ersue |
| 8,542,252 B2 | 9/2013 | Perez et al. |
| 8,599,303 B2 | 12/2013 | Stettner |
| 8,630,924 B2 * | 1/2014 | Groenevelt .......... G06Q 10/087 211/90.01 |
| 8,660,338 B2 | 2/2014 | Ma et al. |
| 8,743,176 B2 | 6/2014 | Stettner et al. |
| 8,757,479 B2 | 6/2014 | Clark et al. |
| 8,812,226 B2 | 8/2014 | Zeng |
| 8,923,893 B2 | 12/2014 | Austin et al. |
| 8,939,369 B2 | 1/2015 | Olmstead et al. |
| 8,954,188 B2 | 2/2015 | Sullivan et al. |
| 8,958,911 B2 | 2/2015 | Wong et al. |
| 8,971,637 B1 | 3/2015 | Rivard |
| 8,989,342 B2 | 3/2015 | Liesenfelt et al. |
| 9,007,601 B2 | 4/2015 | Steffey et al. |
| 9,037,287 B1 | 5/2015 | Grauberger et al. |
| 9,064,394 B1 | 6/2015 | Trundle |
| 9,070,285 B1 | 6/2015 | Ramu et al. |
| 9,129,277 B2 | 9/2015 | MacIntosh |
| 9,135,491 B2 * | 9/2015 | Morandi .................. G06K 9/00 |
| 9,159,047 B2 | 10/2015 | Winkel |
| 9,171,442 B2 | 10/2015 | Clements |
| 9,247,211 B2 * | 1/2016 | Zhang ....................... G06T 7/73 |
| 9,329,269 B2 | 5/2016 | Zeng |
| 9,349,076 B1 | 5/2016 | Liu et al. |
| 9,367,831 B1 | 6/2016 | Besehanic |
| 9,380,222 B2 | 6/2016 | Clayton et al. |
| 9,396,554 B2 | 7/2016 | Williams et al. |
| 9,400,170 B2 | 7/2016 | Steffey |
| 9,424,482 B2 | 8/2016 | Patel et al. |
| 9,517,767 B1 | 12/2016 | Kentley et al. |
| 9,542,746 B2 | 1/2017 | Wu et al. |
| 9,549,125 B1 | 1/2017 | Goyal et al. |
| 9,562,971 B2 | 2/2017 | Shenkar et al. |
| 9,565,400 B1 | 2/2017 | Curlander et al. |
| 9,600,731 B2 | 3/2017 | Yasunaga et al. |
| 9,600,892 B2 | 3/2017 | Patel et al. |
| 9,612,123 B1 | 4/2017 | Levinson et al. |
| 9,639,935 B1 | 5/2017 | Douady-Pleven et al. |
| 9,697,429 B2 | 7/2017 | Patel et al. |
| 9,766,074 B2 | 9/2017 | Roumeliotis et al. |
| 9,778,388 B1 | 10/2017 | Connor |
| 9,791,862 B1 | 10/2017 | Connor |
| 9,805,240 B1 | 10/2017 | Zheng et al. |
| 9,811,754 B2 | 11/2017 | Schwartz |
| 9,827,683 B1 | 11/2017 | Hance et al. |
| 9,880,009 B2 | 1/2018 | Bell |
| 9,928,708 B2 | 3/2018 | Lin et al. |
| 9,980,009 B2 | 5/2018 | Jiang et al. |
| 9,994,339 B2 | 6/2018 | Colson et al. |
| 10,019,803 B2 * | 7/2018 | Venable ................. G06V 20/52 |
| 10,111,646 B2 | 10/2018 | Nycz et al. |
| 10,121,072 B1 | 11/2018 | Kekatpure |
| 10,127,438 B1 | 11/2018 | Fisher et al. |
| 10,197,400 B2 | 2/2019 | Jesudason et al. |
| 10,210,603 B2 | 2/2019 | Venable et al. |
| 10,229,386 B2 | 3/2019 | Thomas |
| 10,248,653 B2 | 4/2019 | Blassin et al. |
| 10,265,871 B2 | 4/2019 | Hance et al. |
| 10,289,990 B2 | 5/2019 | Rizzolo et al. |
| 10,336,543 B1 | 7/2019 | Sills et al. |
| 10,349,031 B2 | 7/2019 | DeLuca |
| 10,352,689 B2 | 7/2019 | Brown et al. |
| 10,394,244 B2 | 8/2019 | Song et al. |
| 2001/0041948 A1 | 11/2001 | Ross et al. |
| 2002/0006231 A1 | 1/2002 | Jayant et al. |
| 2002/0097439 A1 * | 7/2002 | Braica ................ G06K 15/1209 382/274 |
| 2002/0146170 A1 * | 10/2002 | Rom .................... G06V 30/416 382/175 |
| 2002/0158453 A1 | 10/2002 | Levine |
| 2002/0164236 A1 | 11/2002 | Fukuhara et al. |
| 2003/0003925 A1 | 1/2003 | Suzuki |
| 2003/0094494 A1 * | 5/2003 | Blanford .................. G06K 7/14 235/462.07 |
| 2003/0174891 A1 | 9/2003 | Wenzel et al. |
| 2004/0021313 A1 | 2/2004 | Gardner et al. |
| 2004/0131278 A1 | 7/2004 | Imagawa et al. |
| 2004/0240754 A1 | 12/2004 | Smith et al. |
| 2005/0016004 A1 | 1/2005 | Armstrong et al. |
| 2005/0114059 A1 | 5/2005 | Chang et al. |
| 2005/0213082 A1 | 9/2005 | DiBernardo et al. |
| 2005/0213109 A1 | 9/2005 | Schell et al. |
| 2006/0032915 A1 | 2/2006 | Schwartz |
| 2006/0045325 A1 | 3/2006 | Zavadsky et al. |
| 2006/0106742 A1 | 5/2006 | Bochicchio et al. |
| 2006/0285486 A1 | 12/2006 | Roberts et al. |
| 2007/0036398 A1 | 2/2007 | Chen |
| 2007/0074410 A1 | 4/2007 | Armstrong et al. |
| 2007/0272732 A1 | 11/2007 | Hindmon |
| 2008/0002866 A1 * | 1/2008 | Fujiwara ............... G06V 40/166 382/118 |
| 2008/0025565 A1 | 1/2008 | Zhang et al. |
| 2008/0027591 A1 | 1/2008 | Lenser et al. |
| 2008/0077511 A1 | 3/2008 | Zimmerman |
| 2008/0159634 A1 | 7/2008 | Sharma et al. |
| 2008/0164310 A1 | 7/2008 | Dupuy et al. |

(56) References Cited

U.S. PATENT DOCUMENTS

| | | |
|---|---|---|
| 2008/0175513 A1 | 7/2008 | Lai et al. |
| 2008/0181529 A1 | 7/2008 | Michel et al. |
| 2008/0238919 A1 | 10/2008 | Pack |
| 2008/0294487 A1 | 11/2008 | Nasser |
| 2009/0009123 A1 | 1/2009 | Skaff |
| 2009/0024353 A1 | 1/2009 | Lee et al. |
| 2009/0057411 A1 | 3/2009 | Madej et al. |
| 2009/0059270 A1 | 3/2009 | Opalach et al. |
| 2009/0060349 A1* | 3/2009 | Linaker ............... G06Q 20/203 382/209 |
| 2009/0063306 A1 | 3/2009 | Fano et al. |
| 2009/0063307 A1* | 3/2009 | Groenovelt .......... G06Q 10/087 705/28 |
| 2009/0074303 A1 | 3/2009 | Filimonova et al. |
| 2009/0088975 A1 | 4/2009 | Sato et al. |
| 2009/0103773 A1 | 4/2009 | Wheeler et al. |
| 2009/0125350 A1 | 5/2009 | Lessing et al. |
| 2009/0125535 A1 | 5/2009 | Basso et al. |
| 2009/0152391 A1 | 6/2009 | McWhirk |
| 2009/0160975 A1 | 6/2009 | Kwan |
| 2009/0192921 A1 | 7/2009 | Hicks |
| 2009/0206161 A1 | 8/2009 | Olmstead |
| 2009/0236155 A1 | 9/2009 | Skaff |
| 2009/0252437 A1 | 10/2009 | Li et al. |
| 2009/0323121 A1 | 12/2009 | Valkenburg et al. |
| 2010/0026804 A1 | 2/2010 | Tanizaki et al. |
| 2010/0070365 A1 | 3/2010 | Siotia et al. |
| 2010/0082194 A1 | 4/2010 | Yabushita et al. |
| 2010/0091094 A1 | 4/2010 | Sekowski |
| 2010/0118116 A1 | 5/2010 | Tomasz et al. |
| 2010/0131234 A1 | 5/2010 | Stewart et al. |
| 2010/0141806 A1 | 6/2010 | Uemura et al. |
| 2010/0171826 A1 | 7/2010 | Hamilton et al. |
| 2010/0208039 A1 | 8/2010 | Stettner |
| 2010/0214873 A1 | 8/2010 | Somasundaram et al. |
| 2010/0241289 A1 | 9/2010 | Sandberg |
| 2010/0295850 A1 | 11/2010 | Katz et al. |
| 2010/0315412 A1 | 12/2010 | Sinha et al. |
| 2010/0326939 A1 | 12/2010 | Clark et al. |
| 2011/0007967 A1* | 1/2011 | Soderberg ................ G06K 7/14 235/462.11 |
| 2011/0047636 A1 | 2/2011 | Stachon et al. |
| 2011/0052043 A1 | 3/2011 | Hyung et al. |
| 2011/0093306 A1 | 4/2011 | Nielsen et al. |
| 2011/0137527 A1 | 6/2011 | Simon et al. |
| 2011/0168774 A1 | 7/2011 | Magal |
| 2011/0172875 A1 | 7/2011 | Gibbs |
| 2011/0188759 A1* | 8/2011 | Filimonova ............ G06K 9/626 382/195 |
| 2011/0216063 A1 | 9/2011 | Hayes |
| 2011/0242286 A1 | 10/2011 | Pace et al. |
| 2011/0254840 A1 | 10/2011 | Halstead |
| 2011/0286007 A1 | 11/2011 | Pangrazio et al. |
| 2011/0288816 A1 | 11/2011 | Thierman |
| 2011/0310088 A1 | 12/2011 | Adabala et al. |
| 2012/0019393 A1 | 1/2012 | Wolinsky et al. |
| 2012/0022913 A1 | 1/2012 | Volkmann et al. |
| 2012/0069051 A1 | 3/2012 | Hagbi et al. |
| 2012/0075342 A1 | 3/2012 | Choubassi et al. |
| 2012/0133639 A1* | 5/2012 | Kopf ..................... G06T 3/4038 345/419 |
| 2012/0169530 A1 | 7/2012 | Padmanabhan et al. |
| 2012/0179621 A1 | 7/2012 | Moir et al. |
| 2012/0185112 A1 | 7/2012 | Sung et al. |
| 2012/0194644 A1* | 8/2012 | Newcombe ............... G06T 7/74 348/46 |
| 2012/0197464 A1 | 8/2012 | Wang et al. |
| 2012/0201466 A1 | 8/2012 | Funayama et al. |
| 2012/0209553 A1 | 8/2012 | Doytchinov et al. |
| 2012/0236119 A1 | 9/2012 | Rhee et al. |
| 2012/0249802 A1 | 10/2012 | Taylor |
| 2012/0250978 A1 | 10/2012 | Taylor |
| 2012/0269383 A1 | 10/2012 | Bobbitt et al. |
| 2012/0287249 A1 | 11/2012 | Choo et al. |
| 2012/0307108 A1* | 12/2012 | Forutanpour ........... G06T 7/571 348/E5.052 |
| 2012/0323620 A1 | 12/2012 | Hofman et al. |
| 2013/0030700 A1 | 1/2013 | Miller et al. |
| 2013/0119138 A1 | 5/2013 | Winkel |
| 2013/0132913 A1 | 5/2013 | Fu et al. |
| 2013/0134178 A1 | 5/2013 | Lu |
| 2013/0138246 A1 | 5/2013 | Gutmann et al. |
| 2013/0142421 A1* | 6/2013 | Silver .................. G06K 9/6201 382/159 |
| 2013/0144565 A1 | 6/2013 | Miller |
| 2013/0154802 A1 | 6/2013 | O'Haire et al. |
| 2013/0156292 A1 | 6/2013 | Chang et al. |
| 2013/0162806 A1 | 6/2013 | Ding et al. |
| 2013/0176398 A1 | 7/2013 | Bonner et al. |
| 2013/0178227 A1 | 7/2013 | Vartanian et al. |
| 2013/0182114 A1 | 7/2013 | Zhang et al. |
| 2013/0226344 A1 | 8/2013 | Wong et al. |
| 2013/0228620 A1 | 9/2013 | Ahem et al. |
| 2013/0235165 A1 | 9/2013 | Gharib et al. |
| 2013/0236089 A1 | 9/2013 | Litvak et al. |
| 2013/0278631 A1 | 10/2013 | Border et al. |
| 2013/0299306 A1 | 11/2013 | Jiang et al. |
| 2013/0299313 A1 | 11/2013 | Baek, IV et al. |
| 2013/0300729 A1 | 11/2013 | Grimaud |
| 2013/0303193 A1 | 11/2013 | Dharwada et al. |
| 2013/0321418 A1 | 12/2013 | Kirk |
| 2013/0329013 A1 | 12/2013 | Metois et al. |
| 2013/0341400 A1 | 12/2013 | Lancaster-Larocque |
| 2014/0002597 A1 | 1/2014 | Taguchi et al. |
| 2014/0003655 A1 | 1/2014 | Gopalkrishnan et al. |
| 2014/0003727 A1 | 1/2014 | Lortz et al. |
| 2014/0016832 A1 | 1/2014 | Kong et al. |
| 2014/0019311 A1 | 1/2014 | Tanaka |
| 2014/0025201 A1 | 1/2014 | Ryu et al. |
| 2014/0028837 A1 | 1/2014 | Gao et al. |
| 2014/0047342 A1 | 2/2014 | Breternitz et al. |
| 2014/0049616 A1 | 2/2014 | Stettner |
| 2014/0052555 A1 | 2/2014 | MacIntosh |
| 2014/0086483 A1 | 3/2014 | Zhang et al. |
| 2014/0098094 A1 | 4/2014 | Neumann et al. |
| 2014/0100813 A1 | 4/2014 | Showering |
| 2014/0104413 A1 | 4/2014 | McCloskey et al. |
| 2014/0129027 A1 | 5/2014 | Schnittman |
| 2014/0156133 A1 | 6/2014 | Cullinane et al. |
| 2014/0192050 A1 | 7/2014 | Qiu et al. |
| 2014/0195374 A1 | 7/2014 | Bassemir et al. |
| 2014/0214547 A1 | 7/2014 | Signorelli et al. |
| 2014/0267614 A1 | 9/2014 | Ding et al. |
| 2014/0267688 A1 | 9/2014 | Aich et al. |
| 2014/0277691 A1 | 9/2014 | Jacobus et al. |
| 2014/0277692 A1 | 9/2014 | Buzan et al. |
| 2014/0300637 A1 | 10/2014 | Fan et al. |
| 2014/0344401 A1 | 11/2014 | Varney et al. |
| 2014/0351073 A1 | 11/2014 | Murphy et al. |
| 2014/0369607 A1 | 12/2014 | Patel et al. |
| 2015/0015602 A1 | 1/2015 | Beaudoin |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0088618 A1 | 3/2015 | Basir et al. |
| 2015/0088703 A1 | 3/2015 | Yan |
| 2015/0092066 A1 | 4/2015 | Geiss et al. |
| 2015/0106403 A1 | 4/2015 | Haverinen et al. |
| 2015/0117788 A1* | 4/2015 | Patel .................... G06K 9/6218 382/199 |
| 2015/0139010 A1 | 5/2015 | Jeong et al. |
| 2015/0154467 A1 | 6/2015 | Feng et al. |
| 2015/0161793 A1 | 6/2015 | Takahashi |
| 2015/0170256 A1 | 6/2015 | Pettyjohn et al. |
| 2015/0181198 A1 | 6/2015 | Baele et al. |
| 2015/0212521 A1 | 7/2015 | Pack et al. |
| 2015/0245358 A1 | 8/2015 | Schmidt |
| 2015/0262116 A1 | 9/2015 | Katircioglu et al. |
| 2015/0279035 A1 | 10/2015 | Wolski et al. |
| 2015/0298317 A1 | 10/2015 | Wang et al. |
| 2015/0352721 A1 | 12/2015 | Wicks et al. |
| 2015/0363625 A1* | 12/2015 | Wu ....................... G06V 10/44 382/203 |

(56) References Cited

U.S. PATENT DOCUMENTS

| | | |
|---|---|---|
| 2015/0363758 A1* | 12/2015 | Wu ................... G06V 30/414 705/20 |
| 2015/0379704 A1 | 12/2015 | Chandrasekar et al. |
| 2016/0026253 A1 | 1/2016 | Bradski et al. |
| 2016/0044862 A1 | 2/2016 | Kocer |
| 2016/0061591 A1 | 3/2016 | Pangrazio et al. |
| 2016/0070981 A1 | 3/2016 | Sasaki et al. |
| 2016/0092943 A1 | 3/2016 | Vigier et al. |
| 2016/0012588 A1 | 4/2016 | Taguchi et al. |
| 2016/0104041 A1 | 4/2016 | Bowers et al. |
| 2016/0107690 A1 | 4/2016 | Oyama et al. |
| 2016/0112628 A1 | 4/2016 | Super et al. |
| 2016/0114488 A1 | 4/2016 | Mascorro Medina et al. |
| 2016/0129592 A1 | 5/2016 | Saboo et al. |
| 2016/0132815 A1 | 5/2016 | Itoko et al. |
| 2016/0150217 A1 | 5/2016 | Popov |
| 2016/0156898 A1 | 6/2016 | Ren et al. |
| 2016/0163067 A1 | 6/2016 | Williams et al. |
| 2016/0171336 A1* | 6/2016 | Schwartz ............... G06V 10/42 382/173 |
| 2016/0171429 A1 | 6/2016 | Schwartz |
| 2016/0171707 A1 | 6/2016 | Schwartz |
| 2016/0185347 A1 | 6/2016 | Lefevre et al. |
| 2016/0191759 A1 | 6/2016 | Somanath et al. |
| 2016/0253735 A1 | 9/2016 | Scudillo et al. |
| 2016/0253844 A1 | 9/2016 | Petrovskaya et al. |
| 2016/0271795 A1 | 9/2016 | Vicenti |
| 2016/0313133 A1 | 10/2016 | Zeng et al. |
| 2016/0328618 A1 | 11/2016 | Patel et al. |
| 2016/0353099 A1 | 12/2016 | Thomson et al. |
| 2016/0364634 A1* | 12/2016 | Davis .................... G06V 10/10 |
| 2017/0004649 A1 | 1/2017 | Collet Romea et al. |
| 2017/0011281 A1 | 1/2017 | Dijkman et al. |
| 2017/0011308 A1 | 1/2017 | Sun et al. |
| 2017/0032311 A1 | 2/2017 | Rizzolo et al. |
| 2017/0041553 A1 | 2/2017 | Cao et al. |
| 2017/0066459 A1 | 3/2017 | Singh |
| 2017/0074659 A1 | 3/2017 | Giurgiu et al. |
| 2017/0150129 A1 | 5/2017 | Pangrazio |
| 2017/0193434 A1 | 7/2017 | Shah et al. |
| 2017/0219338 A1 | 8/2017 | Brown et al. |
| 2017/0219353 A1 | 8/2017 | Alesiani |
| 2017/0227645 A1 | 8/2017 | Swope et al. |
| 2017/0227647 A1 | 8/2017 | Balk |
| 2017/0228885 A1 | 8/2017 | Baumgartner |
| 2017/0261993 A1 | 9/2017 | Venable et al. |
| 2017/0262724 A1 | 9/2017 | Wu et al. |
| 2017/0280125 A1 | 9/2017 | Brown et al. |
| 2017/0286773 A1* | 10/2017 | Skaff .................... G06V 10/751 |
| 2017/0286901 A1 | 10/2017 | Skaff et al. |
| 2017/0323376 A1 | 11/2017 | Glaser et al. |
| 2018/0001481 A1 | 1/2018 | Shah et al. |
| 2018/0005035 A1 | 1/2018 | Bogolea et al. |
| 2018/0005176 A1 | 1/2018 | Williams et al. |
| 2018/0020145 A1 | 1/2018 | Kotfis et al. |
| 2018/0051991 A1 | 2/2018 | Hong |
| 2018/0053091 A1 | 2/2018 | Savvides et al. |
| 2018/0053305 A1 | 2/2018 | Gu et al. |
| 2018/0101813 A1 | 4/2018 | Paat et al. |
| 2018/0114183 A1 | 4/2018 | Howell |
| 2018/0143003 A1 | 5/2018 | Clayton et al. |
| 2018/0174325 A1 | 6/2018 | Fu et al. |
| 2018/0201423 A1 | 7/2018 | Drzewiecki et al. |
| 2018/0204111 A1 | 7/2018 | Zadeh et al. |
| 2018/0281191 A1 | 10/2018 | Sinyavskiy et al. |
| 2018/0293442 A1 | 10/2018 | Fridental et al. |
| 2018/0313956 A1 | 11/2018 | Rzeszutek et al. |
| 2018/0314260 A1 | 11/2018 | Jen et al. |
| 2018/0314908 A1 | 11/2018 | Lam |
| 2018/0315007 A1 | 11/2018 | Kingsford et al. |
| 2018/0315065 A1 | 11/2018 | Zhang et al. |
| 2018/0315173 A1 | 11/2018 | Phan et al. |
| 2018/0315865 A1 | 11/2018 | Haist et al. |
| 2019/0057588 A1 | 2/2019 | Savvides et al. |
| 2019/0065861 A1 | 2/2019 | Savvides et al. |
| 2019/0073554 A1 | 3/2019 | Rzeszutek |
| 2019/0180150 A1 | 6/2019 | Taylor et al. |
| 2019/0197728 A1 | 6/2019 | Yamao |
| 2019/0392212 A1 | 12/2019 | Sawhney et al. |

FOREIGN PATENT DOCUMENTS

| | | |
|---|---|---|
| CN | 104200086 | 12/2014 |
| CN | 107067382 | 8/2017 |
| EP | 0766098 A1 | 4/1997 |
| EP | 1311993 B1 | 5/2007 |
| EP | 2309378 | 4/2011 |
| EP | 2439487 | 4/2012 |
| EP | 2472475 A1 | 7/2012 |
| EP | 2562688 | 2/2013 |
| EP | 2662831 A2 | 11/2013 |
| EP | 2693362 | 2/2014 |
| GB | 2323238 A | 9/1998 |
| GB | 2330265 A | 4/1999 |
| KR | 101234798 | 1/2009 |
| KR | 1020190031431 | 3/2019 |
| WO | WO 99/23600 | 5/1999 |
| WO | 2003002935 | 1/2003 |
| WO | 2003025805 A1 | 3/2003 |
| WO | 2006136958 A3 | 12/2006 |
| WO | 2007042251 A2 | 4/2007 |
| WO | 2008057504 | 5/2008 |
| WO | 2008154611 | 12/2008 |
| WO | 2012103199 | 8/2012 |
| WO | 2012103202 | 8/2012 |
| WO | 2012154801 | 11/2012 |
| WO | 2013165674 | 11/2013 |
| WO | 2014066422 | 5/2014 |
| WO | 2014092552 | 6/2014 |
| WO | 2014181323 A1 | 11/2014 |
| WO | 2015127503 | 9/2015 |
| WO | 2016020038 | 2/2016 |
| WO | 2018018007 | 1/2018 |
| WO | 2019023249 | 1/2019 |

OTHER PUBLICATIONS

International Search Report and Written Opinion for International Patent Application No. PCT/US2013/053212 dated Dec. 1, 2014.

Bohm, "Multi-Image Fusion for Occlusion-Free Facade Texturing", International Archives of the Photogrammetry, Remote Sensing and Spatial Information Sciences, pp. 867-872 (Jan. 2004).

Senthilkumaran, et al., "Edge Detection Techniques for Image Segmentation—A Survey of Soft Computing Approaches", International Journal of Recent Trends in Engineering, vol. 1, No. 2 (May 2009).

Uchiyama, et al., "Removal of Moving Objects from a Street-View Image by Fusing Multiple Image Sequences", Pattern Recognition, 2010, 20th International Conference On, IEEE, Piscataway, NJ, pp. 3456-3459 (Aug. 23, 2010).

Tseng, et al., "A Cloud Removal Approach for Aerial Image Visualization", International Journal of Innovative Computing, Information & Control, vol. 9 No. 6, pp. 2421-2440 (Jun. 2013).

United Kingdom Intellectual Property Office, Combined Search and Examination Report dated Mar. 11, 2015 for GB Patent Application No. 1417218.3.

United Kingdom Intellectual Property Office, Examination Report dated Jan. 22, 2016 for GB Patent Application No. 1417218.3 (2 pages).

United Kingdom Intellectual Property Office, Combined Search and Examination Report dated Jan. 22, 2016 tor GB Patent Application No. 1521272.3 (6 pages).

Notice of allowance for U.S. Appl. No. 13/568,175 dated Sep. 23, 2014.

Notice of allowance for U.S. Appl. No. 13/693,503 dated Mar. 11, 2016.

Notice of allowance for U.S. Appl. No. 14/068,495 dated Apr. 25, 2016.

Notice of allowance for U.S. Appl. No. 15/211,103 dated Apr. 5, 2017.

(56) References Cited

OTHER PUBLICATIONS

Notice of allowance for U.S. Appl. No. 14/518,091 dated Apr. 12, 2017.
U.S. Appl. No. 15/583,717, filed May 1, 2017.
U.S. Appl. No. 15/583,680, filed May 1, 2017.
U.S. Appl. No. 15/583,740, filed May 1, 2017.
U.S. Appl. No. 15/583,759, filed May 1, 2017.
U.S. Appl. No. 15/583,773, filed May 1, 2017.
U.S. Appl. No. 15/583,786, filed May 1, 2017.
International Patent Application Serial No. PCT/CN2017/083143 filed May 5, 2017.
"Fair Billing with Automatic Dimensioning" pp. 1-4, undated, Copyright Mettler—Toledo International Inc.
"Plane Detection in Point Cloud Data" dated Jan. 25, 2010 by Michael Ying Yang and Wolfgang Forstner, Technical Report 1, 2010, University of Bonn.
"Swift Dimension" Trademark Omniplanar, Copyright 2014.
Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.
Batalin et al., "Mobile robot navigation using a sensor network," IEEE, International Conference on robotics and automation, Apr. 26, May 1, 2004, pp. 636-641.
Bazazian et al., "Fast and Robust Edge Extraction in Unorganized Point clouds," IEEE, 2015 International Conference on Digital Image Computing: Techniques and Applicatoins (DICTA), Nov. 23-25, 2015, pp. 1-8.
Biswas et al. "Depth Camera Based Indoor Mobile Robot Localization and Navigation" Robotics and Automation (ICRA), 2012 IEEE International Conference on IEEE, 2012.
Bristow et al., "A Survey of Iterative Learning Control", IEEE Control Systems, Jun. 2006, pp. 96-114.
Buenaposada et al. "Realtime tracking and estimation of plane pose" Proceedings of the ICPR (Aug. 2002) vol. II, IEEE pp. 697-700.
Carreira et al., "Enhanced PCA-based localization using depth maps with missing data," IEEE, pp. 1-8, Apr. 24, 2013.
Chen et al. "Improving Octree-Based Occupancy Maps Using Environment Sparsity with Application to Aerial Robot Navigation" Robotics and Automation (ICRA), 2017 IEEE International Conference on IEEE, pp. 3656-3663, 2017.
Cleveland Jonas et al: "Automated System for Semantic Object Labeling with Soft-Object Recognition and Dynamic Programming Segmentation", IEEE Transactions on Automation Science and Engineering, IEEE Service Center, New York, NY (Apr. 1, 2017).
Cook et al., "Distributed Ray Tracing ACM SIGGRAPH Computer Graphics", vol. 18, No. 3, ACM pp. 137-145, 1984.
Datta, A., et al. "Accurate camera calibration using iterative refinement of control points," in Computer Vision Workshops (ICCV Workshops), 2009.
Deschaud, et al., "A Fast and Accurate Place Detection algoritm for large noisy point clouds using filtered normals and voxel growing," 3DPVT, May 2010, Paris, France. [hal-01097361].
Douillard, Bertrand, et al. "On the segmentation of 3D LIDAR point clouds." Robotics and Automation (ICRA), 2011 IEEE International Conference on IEEE, 2011.
Dubois, M., et al., A comparison of geometric and energy-based point cloud semantic segmentation methods, European Conference on Mobile Robots (ECMR), p. 88-93, 25-27, Sep. 2013.
Duda, et al., "Use of the Hough Transformation to Detect Lines and Curves in Pictures", Stanford Research Institute, Menlo Park, California, Graphics and Image Processing, Communications of the ACM, vol. 15, No. 1 (Jan. 1972).
F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Federico Tombari et al. "Multimodal cue integration through Hypotheses Verification for RGB-D object recognition and 6DOF pose estimation", IEEE International Conference on Robotics and Automation, Jan. 2013.
Flores, et al., "Removing Pedestrians from Google Street View Images", Computer Vision and Pattern Recognition Workshops, 2010 IEEE Computer Society Conference On, IEE, Piscataway, NJ, pp. 53-58 (Jun. 13, 2010).
Glassner, "Space Subdivision for Fast Ray Tracing." IEEE Computer Graphics and Applications, 4.10, pp. 15-24, 1984.
Golovinskiy, Aleksey, et al. "Min-Cut based segmentation of point clouds." Computer Vision Workshops (ICCV Workshops), 2009 IEEE 12th International Conference on. IEEE, 2009.
Hackel et al., "Contour Detection in unstructured 3D point clouds," IEEE, 2016 Conference on Computer vision and Pattern recognition (CVPR), Jun. 27-30, 2016, pp. 1-9.
Hao et al., "Structure-based object detection from scene point clouds," Science Direct, v191, pp. 148-160 (2016).
Hu et al., "An improved method of discrete point cloud filtering based on complex environment," International Journal of Applied Mathematics and Statistics, v48, i18 (2013).
International Search Report and Written Opinion for corresponding International Patent Application No. PCT/US2016/064110 dated Mar. 20, 2017.
International Search Report and Written Opinion for corresponding International Patent Application No. PCT/US2017/024847 dated Jul. 7, 2017.
International Search Report and Written Opinion for International Application No. PCT/US2019/025859 dated Jul. 3, 2019.
International Search Report and Written Opinion from International Patent Application No. PCT/US2018/030345 dated Sep. 17, 2018.
International Search Report and Written Opinion from International Patent Application No. PCT/US2018/030360 dated Jul. 9, 2018.
International Search Report and Written Opinion from International Patent Application No. PCT/US2018/030363 dated Jul. 9, 2018.
International Search Report and Written Opinion from International Patent Application No. PCT/US2019/025849 dated Jul. 9, 2019.
Jadhav et al. "Survey on Spatial Domain dynamic template matching technique for scanning linear barcode," International Journal of scieve and research v 5 n 3, Mar. 2016)(Year: 2016).
Jian Fan et al: "Shelf detection via vanishing point and radial projection", 2014 IEEE International Conference on image processing (ICIP), IEEE, (Oct. 27, 2014), pp. 1575-1578.
Kay et al. "Ray Tracing Complex Scenes." ACM SIGGRAPH Computer Graphics, vol. 20, No. 4, ACM, pp. 269-278, 1986.
Kelly et al., "Reactive Nonholonoic Trajectory Generation via Parametric Optimal Control", International Journal of Robotics Research, vot. 22, No. 7-8, pp. 583-601 (Jul. 30, 2013).
Lari, Z., et al., "An adaptive approach for segmentation of 3D laser point cloud." International Archives of the Photogrammertry, Remote sensing and spatial information Sciences, vol. XXXVIII-5/W12, 2011, ISPRS Calgary 2011 Workshop, Aug. 29-31, 2011, Calgary, Canada.
Lecking et al: "Localization in a wide range of industrial environments using relative 3D ceiling features", IEEE, pp. 333-337 (Sep. 15, 2008).
Lee et al. "Statistically Optimized Sampling for Distributed Ray Tracing." ACM SIGGRAPH Computer Graphics, vol. 19, No. 3, ACM, pp. 61-67, 1985.
Li et al., "An improved RANSAC for 3D Point cloud plane segmentation based on normal distribution transformation cells," Remote sensing, V9: 433, pp. 1-16 (2017).
Likhachev, Maxim, and Dave Ferguson. "Planning Long dynamically feasible maneuvers for autonomous vehicles." The international journal of Robotics Reasearch 28.8 (2009): 933-945. (Year:2009).
Marder-Eppstein et al., "The Office Marathon: robust navigation in an indoor office environment," IEEE, 2010 International conference on robotics and automation, May 3-7, 2010, pp. 300-307.
McNaughton, Matthew, et al. "Motion planning for autonomous driving with a conformal spatiotemporal lattice." Robotics and Automation (ICRA), 2011 IEEE International Conference on. IEEE, 2011. (Year: 2011).

(56) References Cited

OTHER PUBLICATIONS

Mitra et al., "Estimating surface normals in noisy point cloud data," International Journal of Computational geometry & applications, Jun. 8-10, 2003, pp. 322-328.
N.D.F. Campbell et al. "Automatic 3D Object Segmentation in Multiple Views using Volumetric Graph-Cuts", Journal of Image and Vision Computing, vol. 28, Issue 1, Jan. 2010, pp. 14-25.
Ni et al., "Edge Detection and Feature Line Tracing in 3D-Point Clouds by Analyzing Geometric Properties of Neighborhoods," Remote Sensing, V8 I9, pp. 1-20 (2016).
Norriof et al., "Experimental comparison of some classical iterative learning control algorithms", IEEE Transactions on Robotics and Automation, Jun. 2002, pp. 636-641.
Olson, Clark F., et al. "Wide-Baseline Stereo Vision for terrain Mapping" in Machine Vision and Applications, Aug. 2010.
Oriolo et al., "An iterative learning controller for nonholonomic mobile Robots", the international Journal of Robotics Research, Aug. 1997, pp. 954-970.
Ostafew et al., "Visual Teach and Repeat, Repeat, Repeat: Iterative learning control to improve mobile robot path tracking in challenging outdoor environment", IEEE/RSJ International Conference on Intelligent robots and Systems, Nov. 2013, pp. 176-181.
Park et al., "Autonomous mobile robot navigation using passive RFID in indoor environment," IEEE, Transactions on industrial electronics, vol. 56, issue 7, pp. 2366-2373 (Jul. 2009).
Perveen et al. (An overview of template matching methodologies and its application, International Journal of Research in Computer and Communication Tenology, v2n10, Oct. 2013) (Year: 2013).
Pivtoraiko et al., "Differentially constrained mobile robot motion planning in state lattices", journal of field robotics, vol. 26, No. 3, 2009, pp. 308-333.
Pratt W K Ed: "Digital Image processing, 10-image enhacement, 17-image segmentation", Jan. 1, 2001, Digital Image Processing: PIKS Inside, New York: John Wily & Sons, US, pp. 243-258, 551.
Puwein, J., et al."Robust Multi-view camera calibration for wide-baseline camera networks," in IEEE Workshop on Applications of computer vision (WACV), Jan. 2011.
Rusu, et al. "How to invrementally register pairs of clouds," PCL Library, retrieved from internet on Aug. 22, 2016 [http://pointclouds. org/documentation/tutorials/pairwise_incremental_registration. php].
Rusu, et al. "Spatial Change detection on unorganized point cloud data," PCL Library, retrieved from internet on Aug. 19, 2016 [http://pointclouds.org/documentation/tutorials/octree_change. php].
Schnabel et al. "Efficient RANSAC for Point-Cloud Shape Detection", vol. 0, No. 0, pp. 1-12 (1981).
Szeliski, "Modified Hough Transform", Computer Vision. Copyright 2011, pp. 251-254. Retrieved on Aug. 17, 2017 [http://szeliski. org/book/drafts/SzeliskiBook_20100903_draft.pdf].
Tahir, Rabbani, et al., "Segmentation of point clouds using smoothness constraint," International Archives of Photogrammetry, Remote Sensing and Spatial Information Sciences 36.5 (Sep. 2006): 248-253.
Trevor et al., "Tables, Counters, and Shelves: Semantic Mapping of Surfaces in 3D," Retrieved from Internet Jul. 3, 2018 @ http://citeseerx.ist.psu.edu/viewdoc/download?doi=10.1.1.703.5365&rep=rep1&type=pdf, pp. 1-6.
United Kingdom Intellectual Property Office, "Combined Search and Examination Report" for GB Patent Application No. 1813580.6 dated Feb. 21, 2019.
Varol Gul et al: "Product placement detection based on image processing", 2014 22nd Signal Processing and Communication Applications Conference (SIU), IEEE, Apr. 23, 2014.
Varol Gul et al: "Toward Retail product recognition on Grocery shelves", Visual Communications and image processing; Jan. 20, 2004; San Jose, (Mar. 4, 2015).
Weber et al., "Methods for Feature Detection in Point clouds," visualization of large and unstructured data sets—IRTG Workshop, pp. 90-99 (2010).
Zhao Zhou et al.: "An Image contrast Enhancement Algorithm Using PLIP-based histogram Modification", 2017 3rd IEEE International Conference on Cybernetics (CYBCON), IEEE, (Jun. 21, 2017).
Ziang Xie et al., "Multimodal Blending for High-Accuracy Instance Recognition", 2013 IEEE RSJ International Conference on Intelligent Robots and Systems, p. 2214-2221.
Kang et al., "Kinematic Path-Tracking of Mobile Robot Using Iterative learning Control", Journal of Robotic Systems, 2005, pp. 111-121.
International Search Report and Written Opinion from International Patent Application No. PCT/US2019/064020 dated Feb. 19, 2020.
International Search Report and Written Opinion for International Application No. PCT/US2019/025870 dated Jun. 21, 2019.
Kim, et al. "Robust approach to reconstructing transparent objects using a time-of-flight depth camera", Optics Express, vol. 25, No. 3; Published Feb. 6, 2017.

\* cited by examiner 416-0

416-1

416-2

416-3

METHOD AND APPARATUS FOR EXTRACTING AND PROCESSING PRICE TEXT FROM AN IMAGE SET

CROSS-REFERENCE TO RELATED APPLICATIONS

This application is related to U.S. patent application Ser. No. 15/583,786, entitled "METHOD AND APPARATUS FOR LABEL DETECTION" by Lam, as well as U.S. Provisional Patent Application No. 62/492,670, entitled "PRODUCT STATUS DETECTION SYSTEM" by Perrella et al., all having the same filing date as the present application. The contents of the above-reference applications are incorporated herein by reference in their entirety.

BACKGROUND

Environments in which inventories of objects are managed, such as products for purchase in a retail environment, may be complex and fluid. For example, a given environment may contain a wide variety of objects with different attributes (size, shape, price and the like). Further, the placement and quantity of the objects in the environment may change frequently. Still further, imaging conditions such as lighting may be variable both over time and at different locations in the environment. These factors may reduce the accuracy with which information concerning the objects may be collected within the environment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
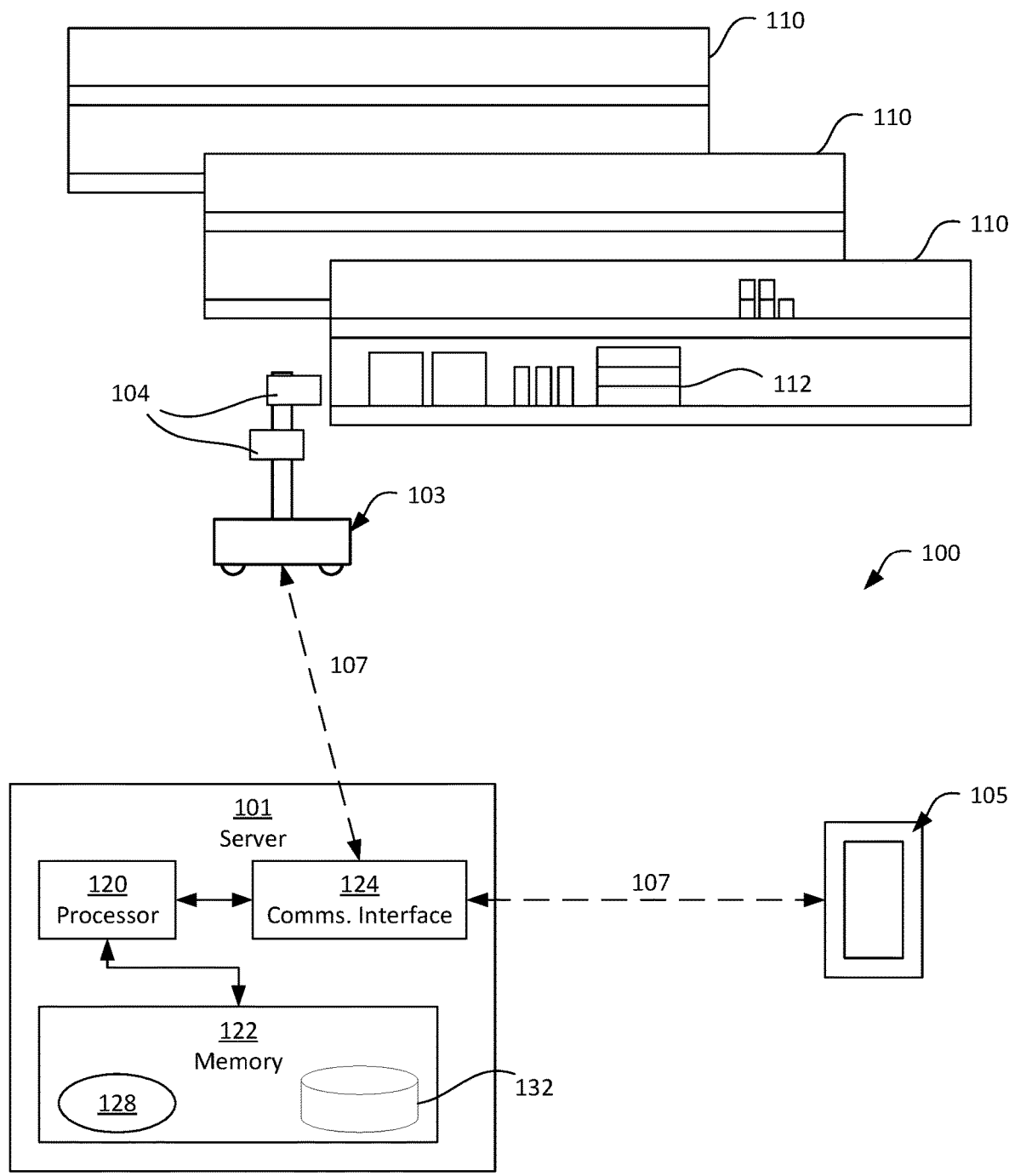
FIG. 1 is a schematic of a mobile automation system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Environments such as warehouses, retail locations (e.g. grocery stores) and the like typically contain a wide variety of products supported on shelves, for selection and purchase by customers. The products are generally labelled—for example, via a label placed on a shelf edge, a peg extending from a back of the shelf, or directly on the product itself—with information such as the price of the product, an identifier such as a SKU number, and the like. Such environments typically also store reference data relating to the products, for example in a central database, which is consulted by point-of-sale terminals during customer checkout to retrieve price information for the products being purchased. In some cases, the price physically labelled on or near the product on the shelves may not match the price stored in the above-mentioned database, leading to a conflict between the label price and the reference price at the point-of-sale terminal.

Mismatches between label and reference prices may require corrective action at one or both of the label and the central database. However, detecting such mismatches in order to allow corrective action to be taken is conventionally performed by human employees, via visual assessment of the shelves and manually-initiated barcode scanning. This form of detection is labor-intensive and therefore costly, as well as error-prone.

Attempts to automate the detection of such mismatches, for example via machine vision techniques, are complicated by difficulties in correctly extracting labelled prices from image data. Such difficulties include non-label text present on products, as well as imaging artifacts such as variations in contrast, reflections, and the like. Autonomous detection of mismatches between label information and reference information is further complicated by the need to retrieve the correct reference data with which to compare the price text extracted from shelf images. To retrieve reference data, the identity of the product to which the label text relates must also be autonomously detected—a process that is subject to similar difficulties as those outlined above in connection with text detection and interpretation.

Examples disclosed herein are directed to a method of extracting price text from an image set, including: obtaining input data comprising (i) a plurality of images depicting shelves supporting products, and (ii) for each of the images, a set of text regions and corresponding price text strings; registering the images to a common frame of reference; identifying a subset of the text regions having overlapping locations in the common frame of reference; selecting one of the text regions from the subset; and presenting the price text string corresponding to the one of the text regions for further processing.

FIG. 1 depicts a mobile automation system 100 in accordance with the teachings of this disclosure. The system 100 includes a server 101 in communication with at least one mobile automation apparatus 103 (also referred to herein simply as the apparatus 103) and at least one mobile device 105 via communication links 107, illustrated in the present example as including wireless links. The system 100 is deployed, in the illustrated example, in a retail environment including a plurality of shelf modules 110 each supporting a plurality of products 112. The shelf modules 110 are typically arranged in a plurality of aisles, each of which includes a plurality of modules aligned end-to-end. More specifically, the apparatus 103 is deployed within the retail environment, and communicates with the server 101 (via the link 107) to navigate, either fully or partially autonomously, the length of at least a portion of the shelves 110. The apparatus 103 is equipped with a plurality of navigation and data capture sensors 104, such as image sensors (e.g. one or more digital cameras) and depth sensors (e.g. one or more Light Detection and Ranging (LIDAR) sensors), and is further configured to employ the sensors to capture shelf data. In the present example, the apparatus 103 is configured to capture a series of digital images of the shelves 110, as well as a series of depth measurements, each describing the distance and direction between the apparatus 103 and one or more points on a shelf 110, such as the shelf itself or the product disposed on the shelf.

The server 101 includes a special purpose imaging controller, such as a processor 120, specifically designed to control the mobile automation apparatus 103 to capture data, obtain the captured data via the communications interface 124 and store the captured data in a repository 132 in the memory 122. The server 101 is further configured to perform various post-processing operations on the captured data and to detect the status of the products 112 on the shelves 110. When certain status indicators are detected by the imaging processor 120, the server 101 is also configured to transmit status notifications (e.g. notifications indicating that products are out-of-stock, low stock or misplaced) to the mobile device 105. The processor 120 is interconnected with a non-transitory computer readable storage medium, such as a memory 122, having stored thereon computer readable instructions for executing price text detection and interpretation, as discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In an embodiment, the processor 120, further includes one or more central processing units (CPUs) and/or graphics processing units (GPUs). In an embodiment, a specially designed integrated circuit, such as a Field Programmable Gate Array (FPGA), is designed to perform the price text detection and interpretation discussed herein, either alternatively or in addition to the imaging controller/processor 120 and memory 122. As those of skill in the art will realize, the mobile automation apparatus 103 also includes one or more controllers or processors and/or FPGAs, in communication with the controller 120, specifically configured to control navigational and/or data capture aspects of the apparatus 103.

The server 101 also includes a communications interface 124 interconnected with the processor 120. The communications interface 124 includes suitable hardware (e.g. transmitters, receivers, network interface controllers and the like) allowing the server 101 to communicate with other computing devices—particularly the apparatus 103 and the mobile device 105—via the links 107. The links 107 may be direct links, or links that traverse one or more networks, including both local and wide-area networks. The specific components of the communications interface 124 are selected based on the type of network or other links that the server 101 is required to communicate over. In the present example, a wireless local-area network is implemented within the retail environment via the deployment of one or more wireless access points. The links 107 therefore include both wireless links between the apparatus 103 and the mobile device 105 and the above-mentioned access points, and a wired link (e.g. an Ethernet-based link) between the server 101 and the access point.

The memory 122 stores a plurality of applications, each including a plurality of computer readable instructions executable by the processor 120. The execution of the above-mentioned instructions by the processor 120 configures the server 101 to perform various actions discussed herein. The applications stored in the memory 122 include a control application 128, which may also be implemented as a suite of logically distinct applications. In general, via execution of the control application 128 or subcomponents thereof, the processor 120 is configured to implement various functionality. The processor 120, as configured via the execution of the control application 128, is also referred to herein as the controller 120. As will now be apparent, some or all of the functionality implemented by the controller 120 described below may also be performed by preconfigured hardware elements (e.g. one or more ASICs) rather than by execution of the control application 128 by the processor 120.

In the present example, in particular, the server 101 is configured via the execution of the control application 128 by the processor 120, to process image and depth data captured by the apparatus 103 to extract price text strings from sets of shelf images, and to identify and retrieve corresponding reference data for comparison to the price text strings.

Figure 2:
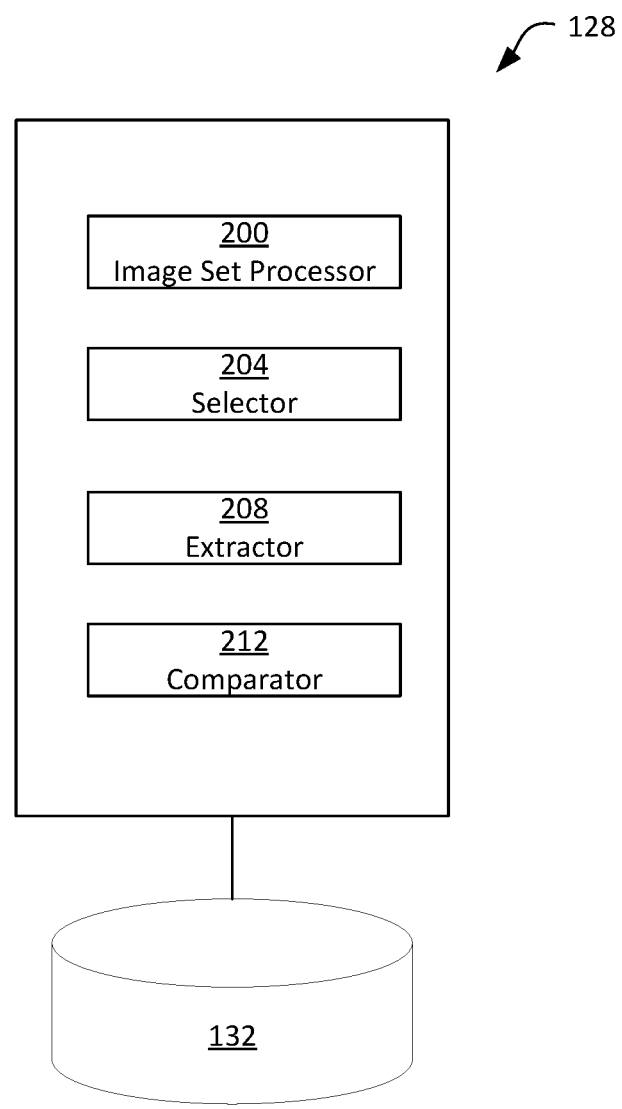
FIG. 2 is a block diagram of certain internal hardware components of the server in the system of FIG. 1.

Turning now to FIG. 2, before describing the operation of the application 128 to identify and interpret price text from captured image data, certain components of the application 128 will be described in greater detail. As will be apparent to those skilled in the art, in other examples the components of the application 128 may be separated into distinct applications, or combined into other sets of components. Some or all of the components illustrated in FIG. 2 may also be implemented as dedicated hardware components, such as one or more Application-Specific Integrated Circuits (ASICs) or FPGAs. For example, in one embodiment, to improve reliability and processing speed, at least some of the components of FIG. 2 are programmed directly into the imaging controller 120, which may be an FPGA or an ASIC having circuit and memory configuration specifically designed to optimize image processing and detection of high volume price label image data being received from the mobile automation apparatus 103. In such an embodiment, some or all of the control application 128, discussed below, is an FPGA or an ASIC chip.

The control application 128, in brief, includes components configured to obtain a plurality of shelf images and, with each image, a set of text region locations and corresponding price text strings. The components of the control application 128 are further configured to identify certain subsets of the above-mentioned text regions and select one text region from each subset. Further, the components of the control application 128 are configured to obtain reference data corresponding to the selected text region, and to compare the price string of the selected region with the reference data to detect mismatches.

More specifically, in the present example, the control application 128 includes an image set processor 200 configured to obtain and register the plurality of shelf images. The control application 128 further includes a selector 204 configured to identify subsets of text regions and select a text region from each subset, as well as an extractor 208 configured to extract portions of the images corresponding to the selected text regions, for use in obtaining reference data. In addition, the control application 128 includes a comparator 212 configured to obtain reference data employing the output of the extractor 208, and to determine whether a mismatch exists between the reference data and the price text associated with the images.

Figure 3:
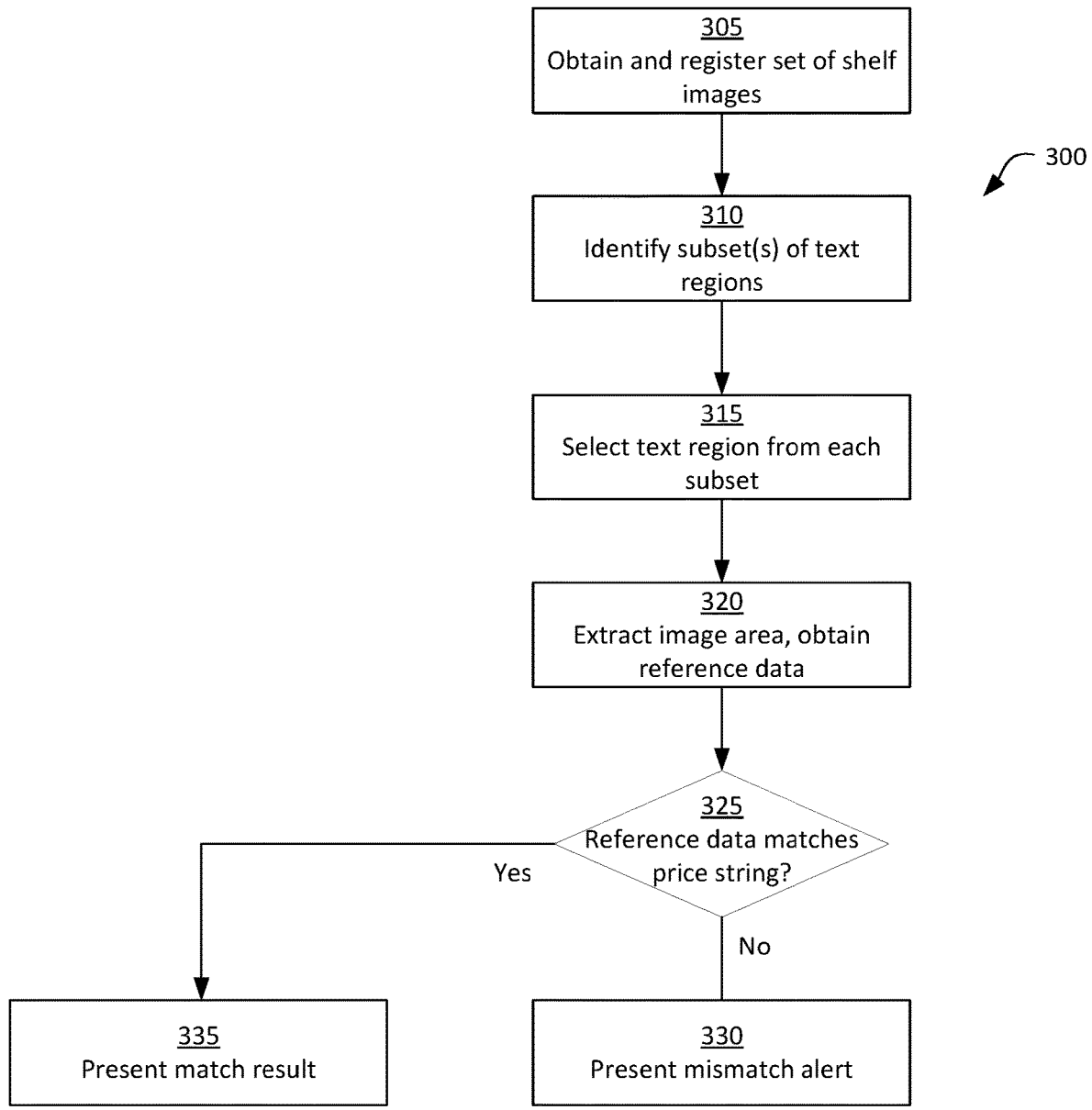
FIG. 3 is a flowchart of a method of price text detection and interpretation.

The functionality of the control application 128 will now be described in greater detail, with reference to the components illustrated in FIG. 2. Turning to FIG. 3, a method 300 of price text extraction and processing is shown. The method 300 will be described in conjunction with its performance on the system 100 as described above.

Figure 4:
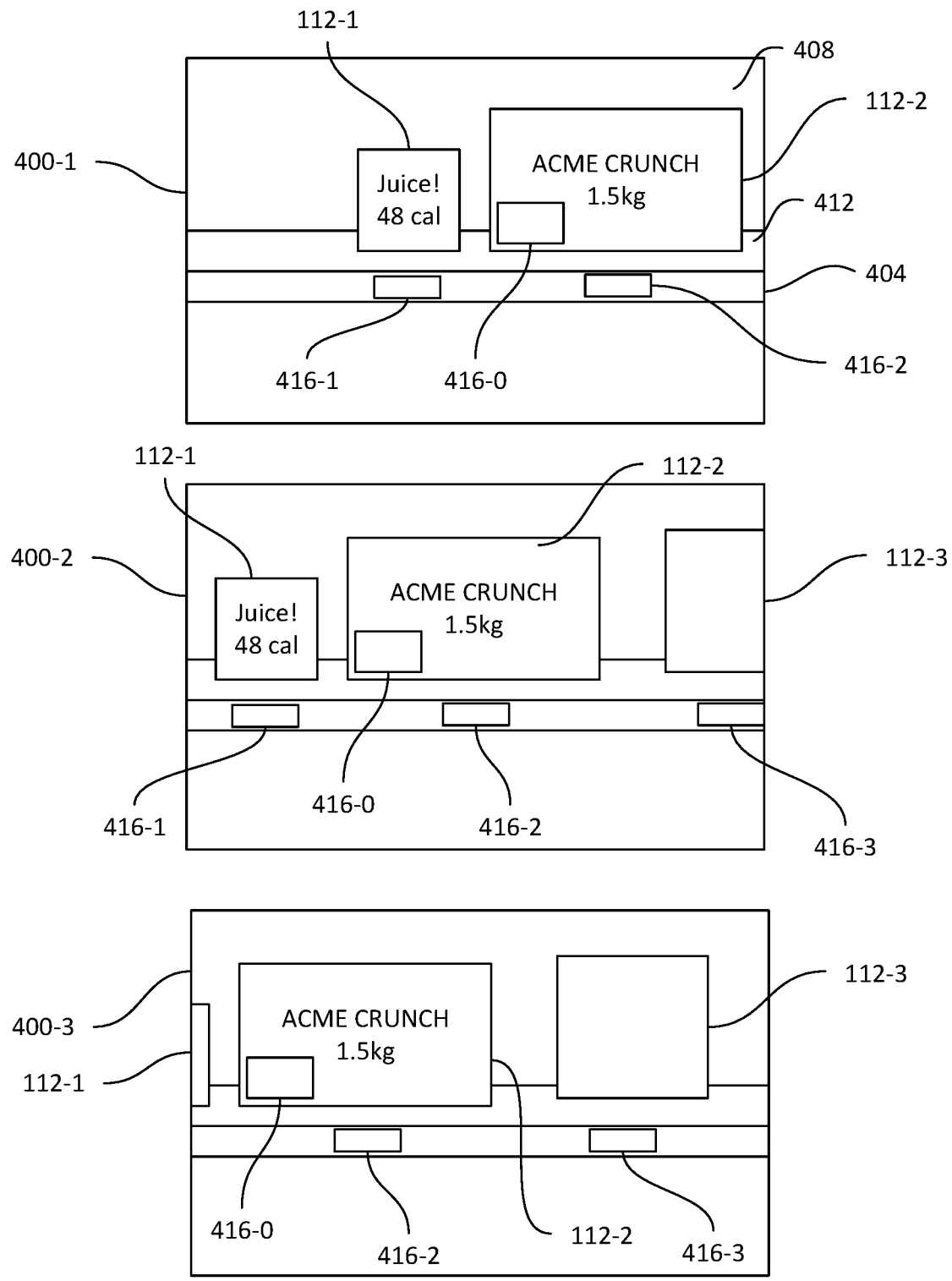
FIG. 4 depicts a set of images obtained during the performance of the method of FIG. 3.

The performance of the method 300 begins at block 305, at which the controller 120, and in particular the image set processor 200, is configured to obtain and register a set of shelf images, such as digital images of the shelf 110, for example captured by the apparatus 103 and stored in the repository 132. An example set of images 400-1, 400-2 and 400-3 is illustrated in FIG. 4, depicting successive portions of a shelf 110 having a shelf edge 404 and a shelf back 408, as well as a support surface 412 extending the between the shelf edge 404 and the shelf back 408 and supporting products 112. In the present example, the set of images 400 is acquired by the apparatus 103 as the apparatus 103 moves among the shelves 110 shown in FIG. 1. Therefore, each portion of a shelf module is typically depicted in more than one image. For example, a product 112-1 is depicted in the images 400-1 and 400-2, while a product 112-2 is depicted in all three images 400 shown in FIG. 4, and a product 112-3 is depicted in the images 400-2 and 400-3.

At block 305, the image set processor 200 is also configured to obtain, for each of the images 400, a set of text regions and corresponding price text strings. The text regions correspond to regions within the images 400 that have been determined to contain price text, for example by another component of the control application 128. In brief, each text region indicates an area within an image 400 that likely contains a price text string, as well as a machine-readable interpretation of the price text string (generated, for example, by an optical character recognition or OCR operation). In other words, each text region indicates an area within an image 400 that likely depicts a price label corresponding to one of the products 112.

The set of text regions and price text strings may be obtained at block 305 in a variety of formats. For example, the text regions and price text strings may be indicated in the image data itself, as an overlay or in one or more metadata fields. In the present example, the text regions and price text strings are obtained from the repository 132 as a list of bounding box definitions and corresponding strings, as shown below in Table 1. The bounding boxes 416 are illustrated in FIG. 4 and identified by the text region identifiers shown in Table 1 for illustrative purposes. In other examples, identifiers need not be assigned to the text regions, and the first column of Table 1 can therefore be omitted.

TABLE 1

Text Regions and Price Text Strings

| Image/Text Region ID | Bounding Box | Price Text String | Confidence Level |
|---|---|---|---|
| 400-1/416-0 | [X1, Y1] [X2, Y2] | $10.89 | 72% |
| 400-1/416-1 | [X1, Y1] [X2, Y2] | $ 2.45 | 91% |
| 400-1/416-2 | [X1, Y1] [X2, Y2] | $12.98 | 84% |
| 400-2/416-0 | [X1, Y1] [X2, Y2] | $10.88 | 85% |
| 400-2/416-1 | [X1, Y1] [X2, Y2] | $ 2.45 | 83% |

TABLE 1-continued

Text Regions and Price Text Strings

| Image/Text Region ID | Bounding Box | Price Text String | Confidence Level |
|---|---|---|---|
| 400-2/416-2 | [X1, Y1] [X2, Y2] | $12.99 | 92% |
| 400-2/416-3 | [X1, Y1] [X2, Y2] | $45.15 | 89% |
| 400-3/416-0 | [X1, Y1] [X2, Y2] | $18.99 | 87% |
| 400-3/416-2 | [X1, Y1] [X2, Y2] | $12.09 | 90% |
| 400-3/416-3 | [X1, Y1] [X2, Y2] | $45.16 | 78% |

The bounding box coordinates shown in Table 1 are typically indicated as pixel positions within each image; in the example above, two pixel positions are included in each record, corresponding to the top-left and bottom-right corners of each bounding box. As will now be apparent, a variety of other formats may be employed for storing the bounding box locations and dimensions.

As seen in Table 1, the data obtained at block 305 also includes the above-mentioned price text strings and, in association with each price text string, a confidence level value. The confidence levels shown above are formatted as percentages, but any other suitable format may also be used to convey a level of certainty that the price text string correctly reflects the price text printed on the labels depicted in the images 400. The confidence levels are typically generated during the OCR operation mentioned earlier, employed to generate the price text strings from image data.

Figure 5:
FIG. 5 depicts the text regions of the images of FIG. 4 in detail.
Figure 5:
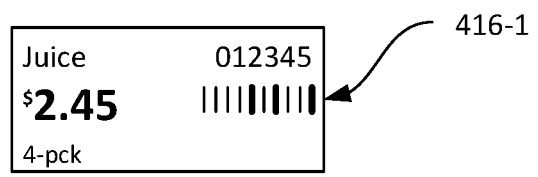
Figure 5:
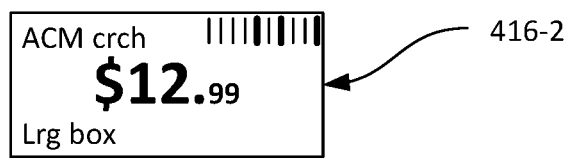
Figure 5:
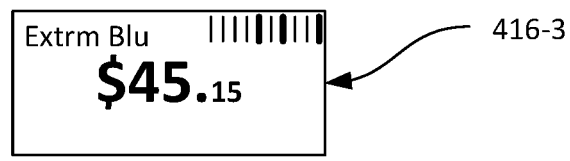

Turning to FIG. 5, each of the text regions 416 is illustrated in greater detail, in isolation from the remainder of the images 400. As will be apparent, the price text strings in Table 1 do not always match the price text displayed on the labels depicted by the images 400 within the regions 416. Mismatches may result, for example, from imaging artifacts that can lead to the incorrect OCR interpretation of certain characters. As will also be apparent, each physical label depicted in the images 400 is represented a plurality of times in the data obtained at block 305 (as a result of appearing in multiple images). The confidence levels mentioned above, together with the multiple representations of each label in the images 400, are employed in the method 300 to select among the text regions 416.

Figure 6:
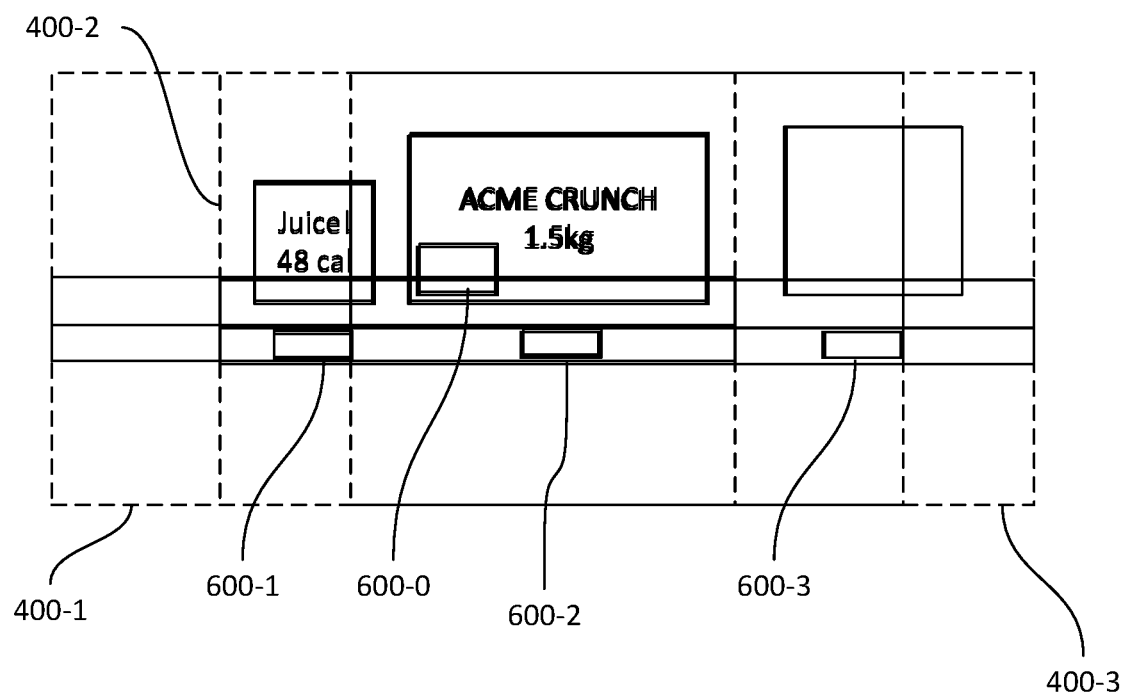
FIG. 6 depicts the images of FIG. 4 following registration.

Referring to FIG. 6, the images 400-1, 400-2 and 400-3 are shown following their registration to a common frame of reference by the image set processor 200. The common frame of reference is a single set of coordinates in which each of the pixels of the images 400 is assigned a position. The common frame of reference is specific to the images 400 in some examples; in other examples, the common frame of reference coordinates correspond to locations in space within the retail environment. Various image registration techniques may be employed at block 305, including feature-based techniques (e.g. edge and blob identification and matching), intensity-based techniques, or a combination thereof. In other examples, the image registration is based on, or supplemented with, navigational data obtained from the apparatus 103 defining the position and orientation of the apparatus 103 within the retail environment when each of the images 400 was captured. As seen in FIG. 6, some features of the images 400 do not align perfectly following registration. This may result from, for example, the fact that each image is captured at a different angle relative to the shelf 110 as the apparatus 103 travels the aisles between shelves 110. However, even for features that do not perfectly register, it is plain from FIG. 6 that some features of the images, including the portions of the images 400 corresponding to the text regions 416, overlap to varying degrees.

Returning to FIG. 3, at block 310 the selector 204 is configured to identify one or more subsets of the text regions 416 having overlapping locations in the common frame of reference to which the images 400 were registered at block 305. Referring again to FIG. 6, four subsets of text regions 416 are illustrated, labelled as subset 600-0 (including overlapping depictions of the text region 416-0), subset 600-1 (including overlapping depictions of the text region 416-1), subset 600-2 (including overlapping depictions of the text region 416-2), and subset 600-3 (including overlapping depictions of the text region 416-3). Thus, at block 310 the selector 204 is configured, in the present example, to identify each of the subsets 600 for further processing.

Figure 7:
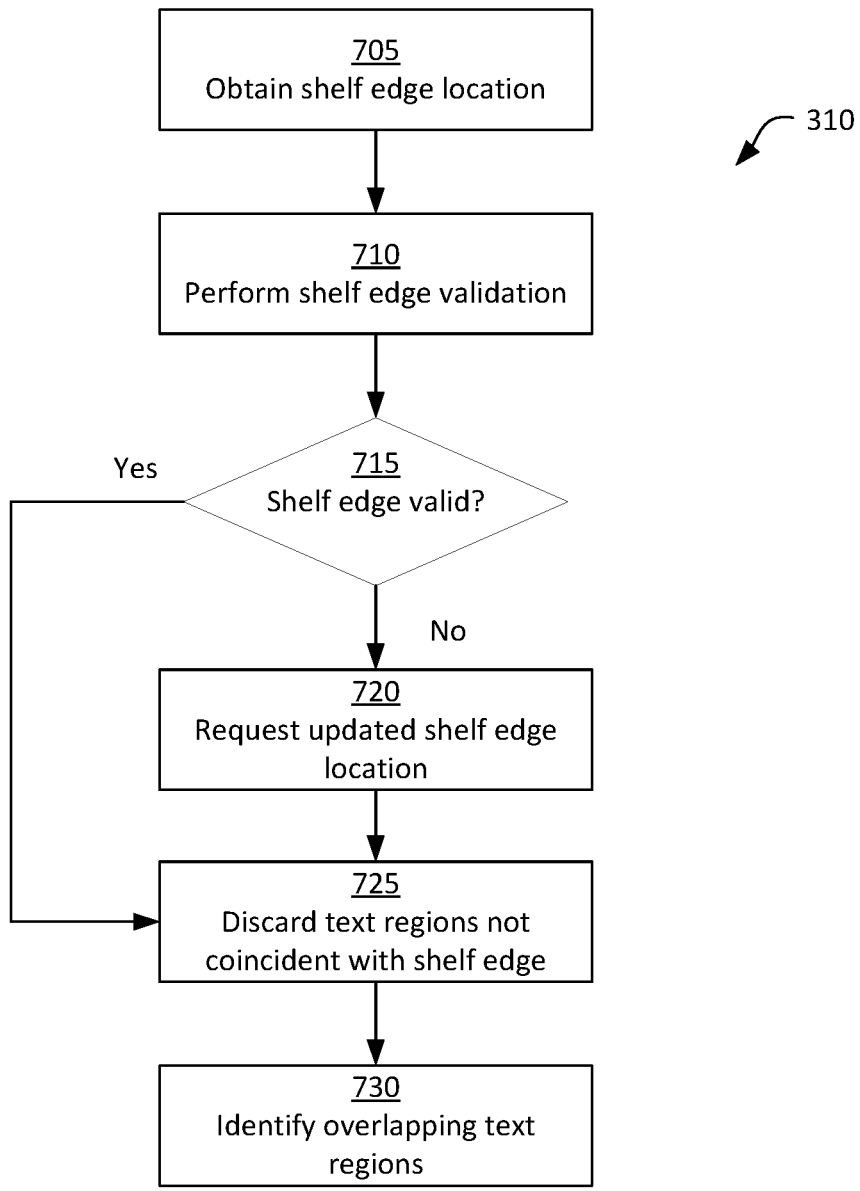
FIG. 7 depicts a method of identifying text region subsets during the performance of the method of FIG. 3.

In other examples, the selector 204 is configured to perform additional actions at block 310. Referring to FIG. 7, a method of identifying subsets of text regions is illustrated. At block 705, the selector 204 is configured to obtain a shelf edge location. The shelf edge location may be retrieved, for example, from the repository 132, by querying the repository for a shelf edge location at a given position within the retail environment (e.g. defined by navigational data associated with the images 400). The selector 204 is also configured to register the shelf edge location with the registered set of images shown in FIG. 6. For example, the shelf edge location is stored in the repository as a height from a ground or other reference surface, as well as a location within the retail environment. The location and height of the shelf edge may be mapped to the registered image set 600 by any suitable registration technique. As a result of such registration, the shelf edge location may be overlaid on the registered set of images obtained at block 305 of the method 300.

At block 710, the selector 204 is configured to perform a shelf edge validation. The image data obtained at block 305 typically also includes depth measurements obtained by the apparatus 103 and stored in the repository 132 in association with the images 400. The depth measurements can therefore also be registered with the images 400, such that at least a subset of the pixels in each image 400 is mapped to a depth measurement, representing a location in a point cloud.

The selector 204 is configured to validate the retrieved shelf edge location by cropping the point cloud mentioned above to select a subset of the points therein falling within the retrieved location of the shelf edge. In other words, the depth measurements that do not fall within the retrieved shelf edge location are discarded or ignored for the purposes of block 710. Having cropped the point cloud, the selector 204 is then configured to group the remaining points into clusters based on their relative positions. In the present example, the selector 204 is configured to compare each pair of points in the cropped point cloud, and when the distance between the pair is below a predetermined threshold, the pair of points are added to a cluster. This process is repeated until all points in the cropped point cloud have been assigned to clusters. Other cluster-building operations may also be performed, as will be apparent to those skilled in the art.

The selector 204 is then configured to select a primary one of the clusters of points for further processing. More specifically, the selector 204 is configured, in the present example, to select the largest cluster, as defined by the number of points in the cluster. The selector 204 can also apply a minimum size threshold, and thus select the largest cluster that meets the minimum size threshold. If no clusters meet the minimum size threshold, performance of the method 315 proceeds to block 720, as will be discussed earlier.

Having selected a primary cluster of points, the selector 204 is configured to fit a plane to the cluster of points by a suitable plane-fitting operation (e.g. the random sample consensus, or RANSAC, plane fitting operation; or a least squares fitting operation, in which the square of the distance between each point and the plane is minimized). The selector 204 is further configured to determine the normal of the fitted plane. That is, the selector 204 is configured to determine the orientation of a line or vector that is perpendicular to the fitted plane. The selector 204 is further configured to determine whether the orientation of the normal matches a predetermined target orientation corresponding to the normal of the known shelf edge. For example, given that shelf edges are typically vertical surfaces, the target orientation may be a horizontal orientation (i.e. substantially parallel to a ground surface in the retail environment). The repository 132 may specify any suitable target orientation, however, based on the physical structure of the shelf edge 404. When the orientation of the normal substantially matches the target orientation, the retrieved shelf edge location is presumed to be valid. That is, the selector 204 is configured to assume that the plane fitted to the selected cluster of points corresponds to a portion of the shelf edge 404, because the orientation of that plane matches the expected orientation of the shelf edge 404. In such a situation, the determination at block 715 is therefore affirmative and the performance of the method 315 proceeds to block 725.

When the determination at block 715 is negative, performance of the method 315 instead proceeds to block 720. Block 720 is also performed when no shelf location is available from the repository 132, or when, as noted above, no cluster of depth measurements exceeds a minimum size threshold. At block 720, the selector 204 is configured to request an updated shelf edge location. The request can be generated and sent, for example, to another component of the control application 128 which performs a shelf edge detection operation employing the images 400 and depth measurements.

Figure 8:
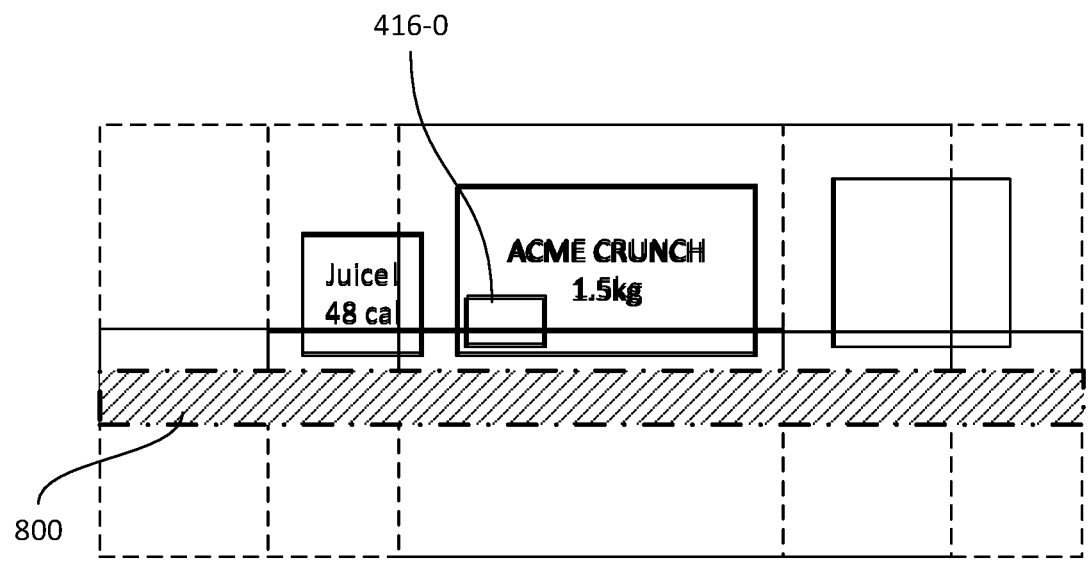
FIG. 8 illustrates the performance of the method of FIG. 7.

At block 725, having either validated the shelf edge location obtained at block 705 or received a shelf edge location at block 720, the selector 204 is configured to discard any text regions 416 that are not coincident with the shelf edge location. Referring to FIG. 8, a shelf edge location bounding box 800 is shown overlaid on the registered set of images 400. As is evident from FIG. 8, the text regions 416-0 from each of the images 400-1, 400-2 and 400-3 are not coincident with the shelf edge location 800. Therefore, in the present example the text regions 416-0 are ignored for further analysis. As will now be apparent, in some cases a text region 416 may partially overlap with the shelf edge location 800. The selector 204 is configured, in some examples, to determine a degree of overlap between the shelf edge location 800 and a text region 416 (e.g. how much of the area of the text region 416 overlaps with the shelf edge location 800), and determine whether the degree of overlap exceeds a threshold. If the degree of overlap does not exceed the threshold, the text region 416 is discarded.

At block 730, the selector 204 is configured to identify the subsets of overlapping text regions 416 from the text regions remaining after the performance of block 725. Thus, in the present example, referring to FIGS. 6 and 8, the subsets 600-1, 600-2 and 600-3, which are coincident with the shelf edge location 800, are selected at block 730.

Returning to FIG. 3, at block 315 the selector 204 is configured to select a text region 416 from each of the subsets identified at block 310. In the present example, the selector 204 is configured to make the selection at block 315 by comparing the confidence levels corresponding to each of the subset of text regions 416 under consideration, and selecting the text region 416 having the highest confidence level. Therefore, in the present example performance of the method 300, as is evident from Table 1, the text region 416-1 from the image 400-1 is selected from the text regions of the subset 600-1. Further, the text region 416-2 from the image 400-2 is selected from the subset 600-2, and the text region 416-3 from the image 400-2 is selected from the subset 600-3. As will be discussed below in further detail, the selection of text regions at block 315 also selects the corresponding price text strings for later use.

At block 320, the extractor 208 is configured to extract an area of at least one of the images 400 corresponding to each identified subset 600. In the present example, the area is extracted from the registered image set shown in FIG. 6. In other examples, however, the area is extracted from one of the images 400. The area extracted for a given subset 600 corresponds to the area of the image encompassed by the text regions 416 in the subset. In other words, the extractor 208 is configured to extract areas of the images 400 corresponding to the text regions 416 illustrated in FIG. 6. The appearance of the extracted areas is therefore as shown in FIG. 5 (with the exception of the text region 416-0, which was excluded as discussed earlier).

As seen in FIG. 5, each of the text regions 416 (and therefore each of the extracted image areas) depicts a barcode. The detection of the text regions 416 typically defines the text regions 416 so as to include nearby barcodes (e.g. as the barcodes themselves may be identified as potential text elements). In some examples, the extractor is configured to extract areas that are larger than the text regions 416 by a predefined padding margin (e.g. a number of pixels on each side of the text regions 416).

Following the extraction of the image areas, the extractor 208 is configured to obtain reference data by providing each extracted image area to a barcode decoder component of the control application 128 (not shown), or of any other element of the system 100. Any suitable decoder may be implemented to identify and decode the barcodes in the extracted areas of the images 400. The extractor 208 is therefore also configured to receive, from the above-mentioned decoder, decoded data corresponding to each extracted image area, such as product identifiers (e.g. UPC numbers). In other examples, rather than extracting areas of the image for transmission to the decoder, the extractor is configured to transmit the entire registered set of images 400 to the decoder, and receive a plurality of decoded data strings along with indications of their locations within the images. In such examples, the extractor is configured to associate each selected text region 416 with one of the barcodes, based on distances between the barcodes and the text region 416. For example, the extractor 208 can be configured to determine the distance between each pair of a text region and a barcode, and associate with each text region 416 the closest barcode to that text region 416.

In further examples, such as those in which the labels do not include barcodes, the reference data is obtained not by decoding barcodes but by providing the images 400 to a product recognition engine, which may be a further component of the control application 128, or a separate component from the control application 128. The product recognition engine is configured to compare the images 400 to a database of product models and, for example based on image feature matching, identify products within the image data and return product identifiers and their locations in the image, which are employed to retrieve a reference price. At block 320, the comparator 212 is therefore configured, in such examples, to receive from the product recognition engine a set of product locations within the images 400 and corresponding product identifiers. The comparator 212 is also configured to associate the received product identifiers with the price text strings, for example based on the distance between the product location (within the image 400) received from the product recognition engine and the location of the price text string within the image 400. In further examples, geometric constraints may be applied to the above association, in addition to an evaluation of distance between price text and product. For example, a price text string may be associated with a product identifier if the price text string was obtained from an area of the image 400 that is both within a threshold distance of the product location and below or above, rather than to one side of, the product location.

Having obtained decoded data from the extracted areas of the images 400, the extractor 208 is configured to then transmit a request, for example to the repository 132, containing the decoded data (or the product identifier received from the product recognition engine) and requesting a reference price for each item of decoded data (that is, for each of the selected text regions 416). As noted earlier, the repository 132 or any other suitable data source stores reference data for the products 112, including product identifiers and corresponding reference price strings. The extractor 208 is configured, upon receiving the reference prices, to pass the product identifiers obtained from the barcodes, the price text strings obtained at block 305 for the selected text regions 416, and the reference price strings obtained at block 320, to the comparator 312. An example of data passed to the comparator 312 is shown in Table 2.

TABLE 2

| Comparator Inputs | | | |
|---|---|---|---|
| Image/Text Region ID | Price Text String | Product ID | Reference Price |
| 400-1/416-1 | $ 2.45 | 12345 | $ 2.45 |
| 400-2/416-2 | $12.99 | 12346 | $12.20 |
| 400-2/416-3 | $45.15 | 12347 | $45.15 |

The comparator 212, responsive to receiving the price text strings and reference prices, is configured at block 325 to determine whether the price text string matches the corresponding reference price for each selected text region 416. As will be apparent from Table 2, the price text string and reference price for the text regions 416-1 and 416-3 match, while the price text string and reference price for the text region 416-2 do not match. Therefore, the performance of the method 300 proceeds to block 330, at which the comparator 212 is configured to generate and present a mismatch alert, for example via a user interface of the mobile device 105 or another remote computing device. The mismatch alert generated at block 330 includes the product identifier (e.g. as shown in Table 2), as well as the location within the retail environment that corresponds to the text region 416. For example, the location may indicate the aisle and shelf module on which the label corresponding to the mismatched text region 416 is located. The mismatch alert can be presented in a variety of ways. In some examples, the alert is transmitted from the server 101 to the mobile device 105 for presentation on a display of the mobile device 105. In other examples, the alert is stored in the repository 132 for further processing.

When the determination at block 325 is affirmative, the performance of the method 300 proceeds to block 335, at which the match result is presented, for example by storing an indication in the repository 132 that a successful price compliance check has been performed for the relevant product identifier. In other examples, block 330 may be omitted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of extracting price text from an image set, comprising:
    obtaining, from an image sensor by an image set processor, input data comprising (i) a plurality of images depicting shelves supporting products, and (ii) for each of the images, a set of text regions and corresponding price text strings, wherein each text region is indicated by a set of pixel coordinates within the corresponding image obtained from the image sensor;
    registering, by the image set processor, the images to a common frame of reference;
    identifying, by a selector interconnected with the image set processor, a subset of the text regions having overlapping locations in the common frame of reference by retrieving from a repository a shelf edge location in the common frame of reference based on navigational data associated with each of the plurality of images and discarding any text regions that are not coincident with the shelf edge location;
    selecting, by the selector, one of the text regions from the subset; and
    presenting, by the selector, the price text string corresponding to the one of the text regions for comparison to a reference price.

2. The method of claim 1, wherein identifying the subset of text regions comprises identifying text regions having at least a predefined degree of overlap in the common frame of reference.

3. The method of claim 1, wherein the input data further comprises a confidence value corresponding to each of the price text strings.

4. The method of claim 3, wherein selecting one of the text regions comprises selecting the one of the subset of text regions having the highest confidence value.

5. The method of claim 1, further comprising: obtaining a plurality, of depth measurements corresponding to the plurality of images; and responsive to obtaining the shelf edge location, performing a validation of the shelf edge location based on the depth measurements.

6. The method of claim 5, where performing the shelf edge validation comprises:
selecting a subset of the depth measurements falling within the shelf edge location obtained in the common frame of reference;
clustering the subset of the depth measurements into a plurality of clusters;
selecting a primary one of the clusters;
fitting a plane to the primary cluster; and
determining whether the plane has a preconfigured orientation.

7. The method of claim 1, further comprising:
obtaining a reference price;
comparing the price text string corresponding to the one of the subset of text regions to the reference price; and
presenting a result of the comparison.

8. The method of claim 7, wherein obtaining the reference price comprises:
extracting an area of at least one of the images at a location corresponding to the subset of text regions;
providing the area to a barcode decoder;
receiving decoded data from the barcode decoder, the decoded data identifying a product;
generating a price query containing the decoded data; and
receiving, responsive to the price query, the reference price.

9. The method of claim 7, wherein obtaining the reference price comprises:
providing the image to a product recognition engine;
receiving, from the product recognition engine, a location indicator within the image and a product identifier associated with the location;
generating a price query containing the product identifier; and
receiving, responsive to the price query, a reference price.

10. A server for extracting price text from an image set, comprising:
an image set processor configured to obtain, from an image sensor, input data comprising (i) a plurality of images depicting shelves supporting products, and (ii) for each of the images, a set of text regions and corresponding price text strings, wherein each text region is indicated by a set of pixel coordinates within the corresponding image obtained from the image sensor;
the image set processor further configured to register the images to a common frame of reference;
a selector configured to:
identify a subset of the text regions having overlapping locations in the common frame of reference by retrieving from a repository a shelf edge location in the common frame of reference based on navigational data associated with each of the plurality of images and discarding any text regions that are not coincident with the shelf edge location;
select one of the text regions from the subset; and
present the price text string corresponding to the one of the text regions for comparison to a reference price.

11. The server of claim 10, the selector configured to identify the subset of text regions by identifying text regions having at least a predefined degree of overlap in the common frame of reference.

12. The server of claim 10, wherein the input data further comprises a confidence value corresponding to each of the price text strings.

13. The server of claim 12, the selector configured to select one of the text regions by selecting the one of the subset of text regions having the highest confidence value.

14. The server of claim 10, the selector further configured to:
obtain a plurality of depth measurements corresponding to the plurality of images; and
responsive to obtaining the shelf edge location, perform a validation of the shelf edge location based on the depth measurements.

15. The server of claim 14, the selector configured to perform the shelf edge validation by:
selecting a subset of the depth measurements falling within the shelf edge location obtained in the common frame of reference;
clustering the subset of the depth measurements into a plurality of clusters;
selecting a primary one of the clusters;
fitting a plane to the primary cluster; and
determining whether the plane has a preconfigured orientation.

16. The server of claim 10, further comprising a comparator configured to:
obtain a reference price;
compare the price text string corresponding to the one of the subset of text regions to the reference price; and
present a result of the comparison.

17. The server of claim 16, further comprising an extractor configured to:
extract an area of at least one of the images at a location corresponding to the subset of text regions;
provide the area to a barcode decoder;
receive decoded data from the barcode decoder, the decoded data identifying a product;
the comparator configured to obtain the reference price by generating a price query containing the decoded data, and receiving, responsive to the price query, the reference price.

18. The server of claim 16, the comparator configured to obtain the reference price by:
providing the image to a product recognition engine;
receiving, from the product recognition engine, a location indicator within the image and a product identifier associated with the location;
generating a price query containing the decoded data; and
receiving, responsive to the price query, a reference price.

* * * * *